United States Patent [19]

Kumferman

[11] Patent Number: 4,473,151

[45] Date of Patent: Sep. 25, 1984

[54] BELT CONVEYOR SIDE WING

[75] Inventor: Robert Kumferman, Menominee Falls, Wis.

[73] Assignee: Jorgensen Conveyors, Inc., Milwaukee, Wis.

[21] Appl. No.: 496,678

[22] Filed: May 25, 1983

Related U.S. Application Data

[63] Continuation of Ser. No. 371,938, Apr. 26, 1982, abandoned.

[51] Int. Cl.³ .............................................. B65G 17/10
[52] U.S. Cl. ..................................................... 198/822
[58] Field of Search .......................................... 198/822

[56] References Cited

U.S. PATENT DOCUMENTS 1,077,918 11/1913 Seck ..................................... 198/822
3,233,722 2/1966 Jorgensen ............................ 198/822

Primary Examiner—Robert J. Spar
Assistant Examiner—Jonathan D. Holmes
Attorney, Agent, or Firm—Quarles & Brady

[57] ABSTRACT

A side wing for a hinged metal belt conveyor is disclosed which has a diagonal offset for overlapping of adjacent side wings. The side wings are mounted on the extending ends of hinged rods journaled in openings in the lower corners of the side wings. The lower corners are each formed as an arc of a circle having its center at the center of an opening. The bottom edge of the side wing has a profile either of a straight line which lies at a distance from the center of the openings which is less than the radius of the arc, or which has the arc extending for some distance from a point below the center of the opening towards the other opening of the side wing. Such modified profile of the bottom edge reduces interference with adjacent side wings when the belt turns a corner.

1 Claim, 6 Drawing Figures

BELT CONVEYOR SIDE WING

This application is a continuation of application Ser. No. 371,938 filed Apr. 26, 1982, now abandoned.

BACKGROUND OF THE INVENTION

This invention relates to metal belt conveyors, and particularly to improved side wings for such conveyors which permit tighter turns.

Flexible metal belt conveyors are used for many purposes in manufacturing and industrial fields, such as the moving of sand and gravel, ores and other raw materials, machine parts being treated or processed, and metal chips generated in machining processes. Such belts typically take the form of plates or aprons which include an elongated flat body with staggered hinge barrels formed along their front and rear edges. The hinge barrels of one apron are interdigited with the hinge barrels of another apron to form a piano-type hinge with a long rod passing through the barrels. Rollers are typically mounted on the projecting ends of the rods outboard of the aprons. Upstanding side wings are usually mounted on the rods between the lateral edges of the aprons and the rollers. The side wings typically link successive rods and overlap each other to form a series of wings. The upstanding side wings function to retain material on the upper conveying surface of the belt. An example of this common form of metal belt conveyor is found in U.S. Pat. No. 3,233,722 issued February 8, 1966 to C. T. Jorgensen.

As illustrated in the aforesaid patent to Jorgensen, past practice has been to provide a diagonal offset in the side wings so that when the successive adjacent side wings are overlapped they provide, in effect, walls at the lateral edges of the conveyor belt, Such diagonal offsets and overlapping create limitations as to the degree of curvature which the conveyor belt can assume. Specifically, the diagonal offset will interfere with the bottom edge of the succeeding side wall if too tight a turn is attempted.

I have found a simple yet effective way to reduce the amount of interference and permit tighter turns by altering the profile of the side wings.

SUMMARY OF THE INVENTION

In accordance with the invention, there is provided a belt conveyor having a plurality of conveyor plate sections with hinge loops carried by the ends of the sections and with the loops of the sections in transverse alignment, hinge rods extending through the aligned loops and projecting outwardly from the sides of the plate sections, and a plurality of overlapping, generally rectangular side wings on both sides of the plate sections, each side wing having its lower corners provided with bearing openings which receive the hinge rods, each side wing having an offset portion defined by a diagonal bend, each side wing having its lower corners formed as an arc of a circle having its center at the center of the respective bearing opening, and the profile of the lower edge of each side wing being such that from a point beneath each bearing opening and for a distance toward the other bearing opening no portion of the lower edge lies further from the center of the adjacent bearing than the radius of such arc.

It is a principal object of the invention to provide a metal belt conveyor including an improved side wing which permits a tighter turn of the belt about a hub or sprocket.

It is a further object of the invention to provide such a side wing in which the profile is altered along its bottom edge to remove interference with the diagonal offset of an adjacent side wing.

The foregoing and other objects and advantages of the invention will appear in the following description. In the description reference is made to the accompanying drawings which disclose preferred embodiments of the invention.

DETAILED DESCRIPTION OF THE PREFERRED EMBODIMENTS

Figure 1:
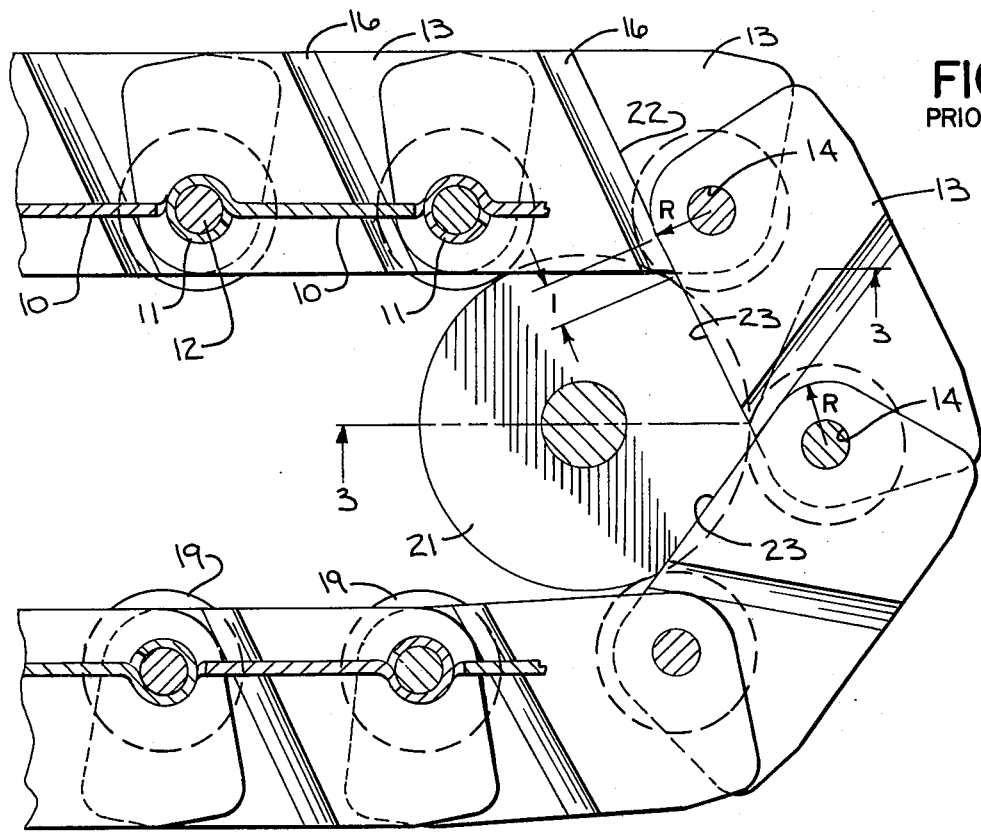
FIG. 1 is a view in vertical section of a conventional metal belt conveyor of the prior art.

Referring to FIG. 1, the typical conveyor belt is made up of a plurality of plate sections or aprons 10 each including an elongated flat body with staggered hinge barrels or loops 11 formed on its front and rear edges. The staggered arrangement of the loops or barrels on the opposite edges of each apron 10 permit them to be interdigited with the loops or barrels 11 of the adjacent aprons 10 and a hinge rod 12 is received through the aligned barrels 11 to join together the adjacent aprons 10.

Figure 3:
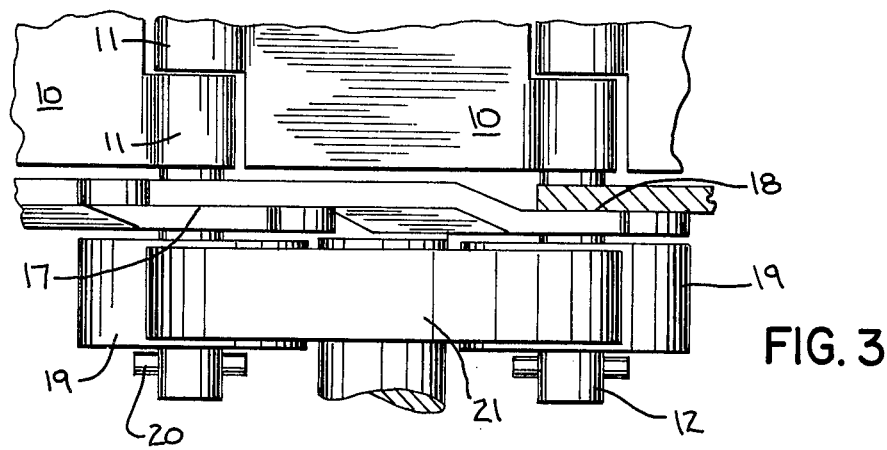
FIG. 3 is a bottom plan view of the overlapping side wings taken from the plane of the line 3—3 of FIG. 1.

The rods 12 extend beyond the lateral edges of the aprons 10 in both directions. A series of side wings 13 are mounted on the projecting portions of the rods 12 outboard of the lateral edges of the aprons 10. Each side wing 13 is formed by stamping operations from a plate of sheet metal. The side wings have a substantially rectangular border. Circular bearing openings 14 are formed in the lower two corners of each side wing 13 and it is these bearing openings which receive the rods 12. The side wings 13 are each provided with a diagonal bend 16 which, as shown in FIG. 3, is of such depth that the rear face 17 of one resulting offset portion is slightly forward of the plane of the front face 18 of the other offset portion. The side wings 13 are mounted on the rods 12 in an overlapping fashion as shown in FIG. 3. The side wings which form the two series on opposite sides of the conveyor belt are mirror images of each other.

A series of rollers 19 are mounted on the ends of the rods 12 outside of the side wings 13. The belt assembly is completed by cotter pins 20 extending through the rods 12 adjacent their ends. The belt extends around hubs 21 which engage the rollers 19 and define the belt path.

What has been described thus far represents what is known in the prior art. In the prior art, as illustrated in FIG. 1, the lower corners of the side wings 13 were formed as an arc of a circle having its center at the center of a respective bearing opening and having a radius R which was equal to or slightly less than the shortest distance between the center of a bearing opening and the closest edge 22 of the diagonal bend 16. The bottom most edge 23 of each side wing 13 had a profile which was a straight line extending from a point directly beneath a bearing opening to a similar point directly beneath the other bearing opening. The profile of the bottom edge 23 was therefore tangent to the arc of the circle with the radius R at each end. Because of the profile of the bottom edge 23 of the side wing 13 of the prior art, a significant restriction occurs when an attempt is made to turn a tight corner with the belt. Thus, as seen in FIG. 1, the bottom edge 23 will interfere with the edge 22 of a bend of an adjacent side wing and this provides an absolute limit to the sharpness of the turn which can be provided in conveyor chains of the prior art.

Figure 2:
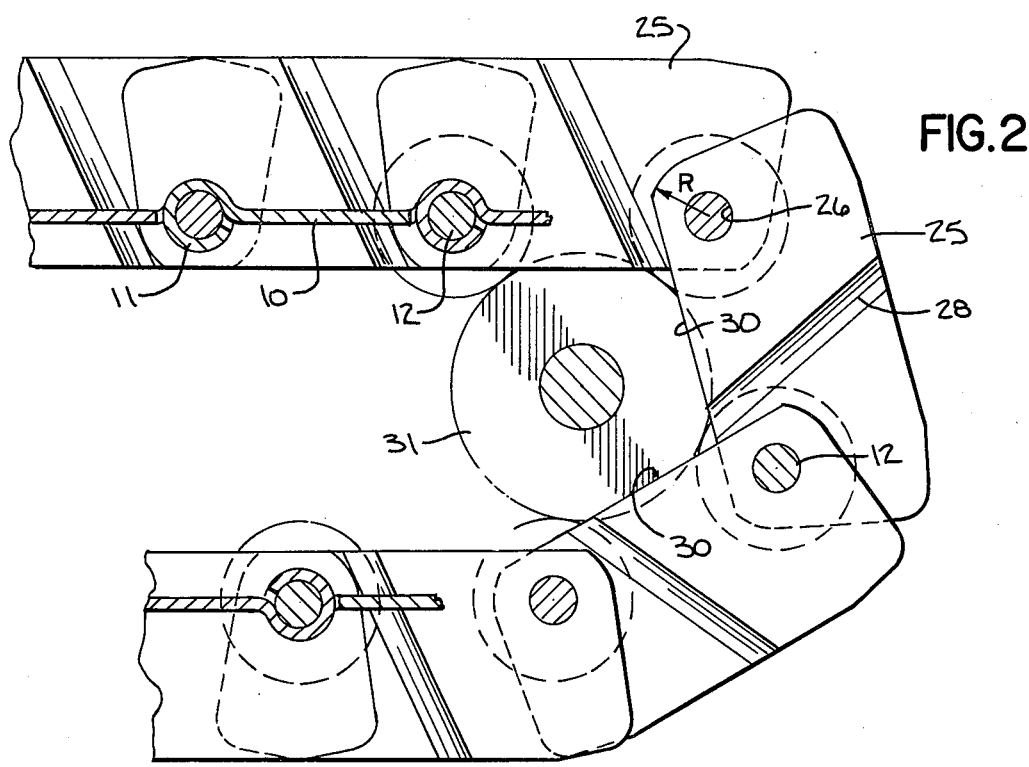
FIG. 2 is a view in vertical section similar to FIG. 1 but illustrating the improved form of side wings in accordance with the present invention.
Figure 4:
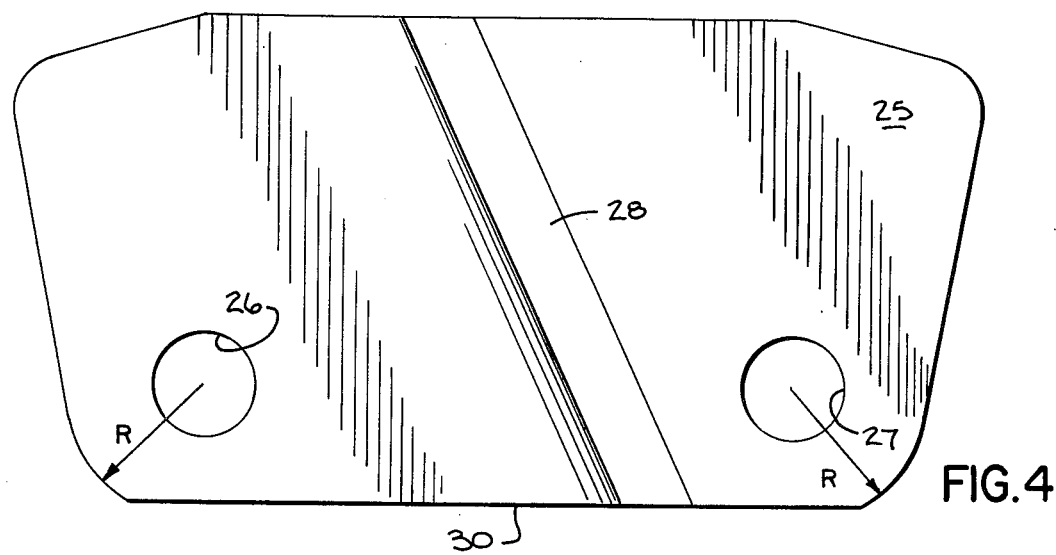
FIG. 4 is a view in elevation of the side wings of FIG. 2.
Figure 5:
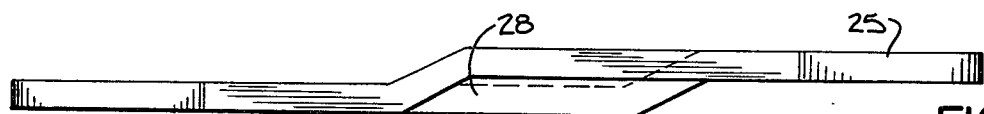
FIG. 5 is a top plan view of the side wing of FIG. 4.

In accordance with the present invention, a side wing 25 has a generally rectangular border with bearing openings 26 and 27 in it lower corners and with a diagonal bend 28. Also, the lower corners are each formed as an arc of a circle of radius R having its center at the center of a respective bearing opening. The profile of the bottom edge 30 of the side wing 25 is so proportioned as to remove a substantial area of interference which existed in the prior art. The area of interference of the prior art is from a point directly beneath the center of a bearing opening and for a distance towards the other bearing opening. In FIG. 1 that area of interference is along the dimension I. Referring to FIG. 4, the bottom edge 30 of the side wing 25 is formed as a straight line but it is not tangent to the arc with the radius R. Instead, the bottom edge 30 lies along a straight line which is parallel to a line between the centers of the bearing openings 26 and 27 but at a distance from that line which is less than the radius R. As a result, and as illustrated in FIG. 2, a substantial area of interference is eliminated and the belt is able to turn on a hub 31 of substantially smaller diameter than that of the prior art for the same size of chain. As a result, the turn of the belt is much tighter. The closer that the line defining the bottom edge 30 is to the line between the centers of the bearing openings 26 and 27, the tighter will be the turn which can be made.

Figure 6:
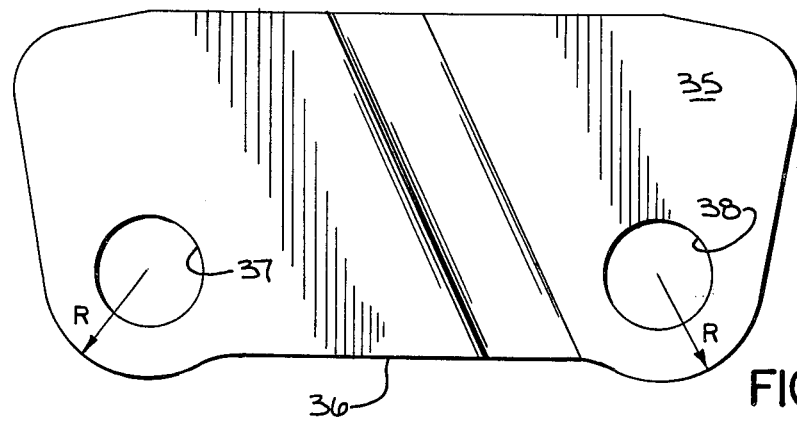
FIG. 6 is a view in elevation of a second embodiment of the side wing in accordance with this invention.

Referring to FIG. 6, there is shown an alternate embodiment of a side wing 35 in which the profile of the bottom edge 36 is formed by carrying the arc of the circle of the radius R beyond the point beneath the bearing openings 37 and 38 and thereafter merging with a straight line which lies at a distance from the line between the centers of the openings 37 and 38 that is less than the radius R.

In both embodiments, the profile of the lower edge of the side wing is such that from a point immediately beneath the center of a bearing opening and for some distance towards the opposite bearing opening, no portion of the lower edge lies at a distance greater than the radius R from the center of the bearing opening.

I claim:

1. In a belt conveyor having a plurality of conveyor plate sections with hinge loops carried by the ends of said sections and with the loops of adjacent sections in transverse alignment, hinge rods extending through the aligned loops and projecting outwardly from the sides of the plate sections, and a plurality of overlapping, generally rectangular side wings on both sides of the plate sections and unconnected thereto, each side wing having its two lower corners provided with a bearing opening which receives a hinge rod and each side wing having an offset portion defined by a diagonal bend such that each side wing has portions which lie in two parallel offset planes and in no other planes, the offset portions of overlapping side wings tending to interfere with each other at the bend as the overlapping side wings pivot about their common hinge rod, thereby limiting the turning radius of the conveyor belt the improvement therein comprising:

each of said side wings having each of its lower corners formed as an arc of a circle whose center is at the center of the respective bearing opening, the radius of said circle being no greater than the shortest distance between the center of a bearing opening and the nearest edge of the bend of an adjacent side wing and the profile of the lower edge of each side wing being such that from a point directly beneath the center point of each bearing opening and for a distance along said arc toward the other bearing opening no portion of the lower edge lies farther from the center of the adjacent bearing than the radius of said circle thereby reducing the required turning radius of the conveyor belt.

* * * * *